Oct. 16, 1934.  H. BROOKE ET AL  1,977,374
METHOD OF MAKING BLOCKS OF PLASTIC MATERIAL AND APPARATUS THEREFOR
Filed Aug. 6, 1927   9 Sheets-Sheet 1
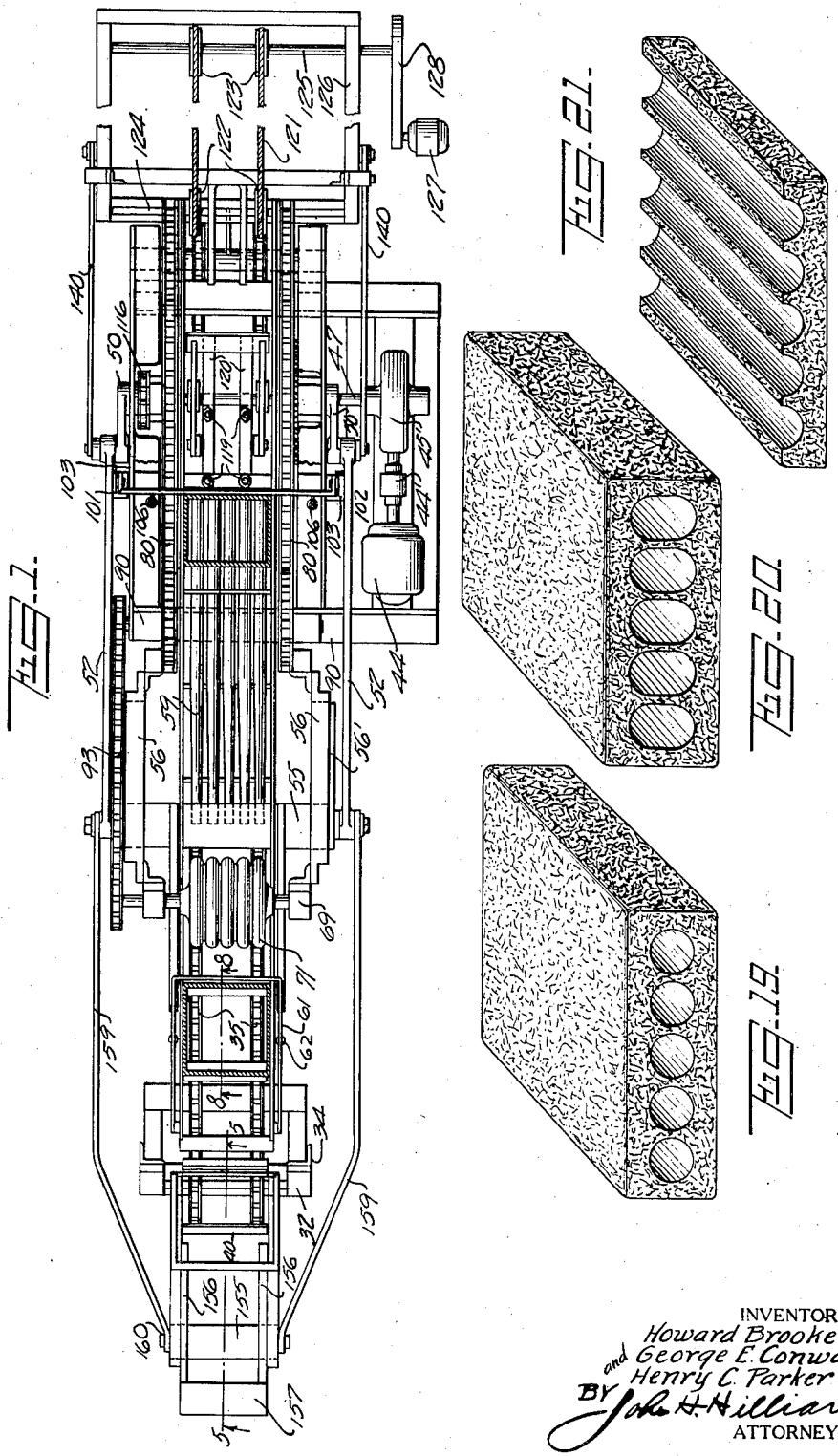
INVENTORS
Howard Brooke
and George E. Conway
Henry C. Parker
BY John H. Hilliard
ATTORNEY

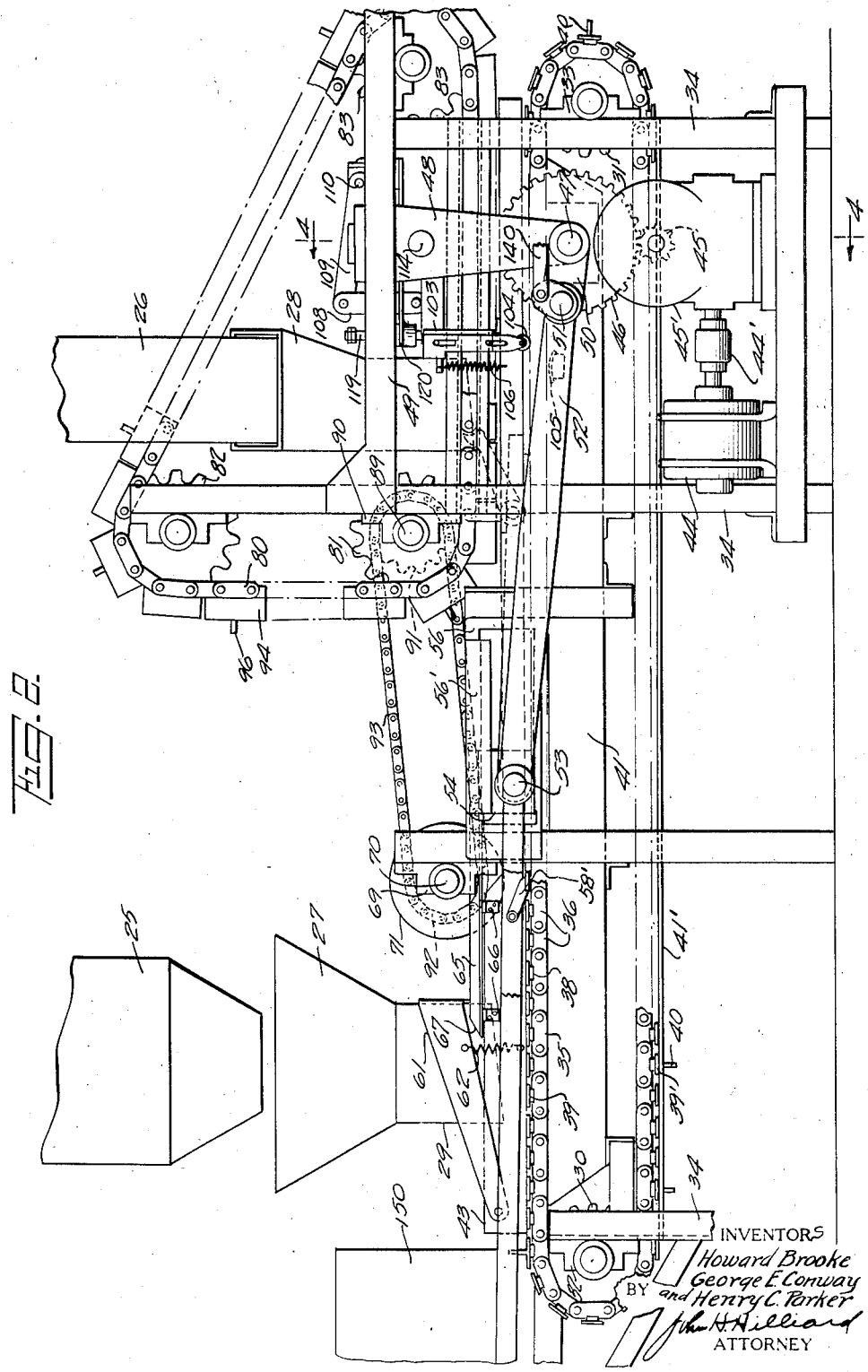

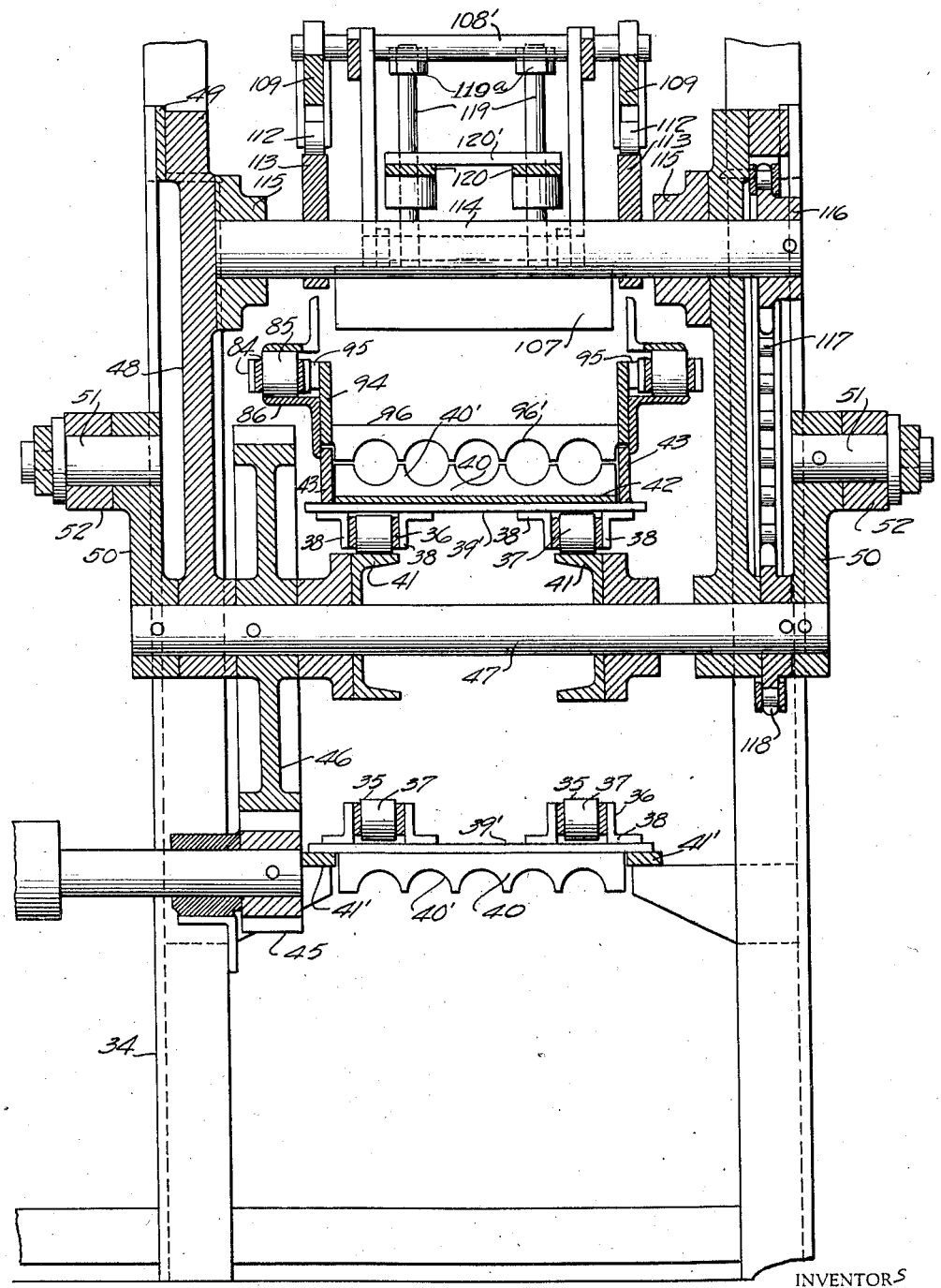

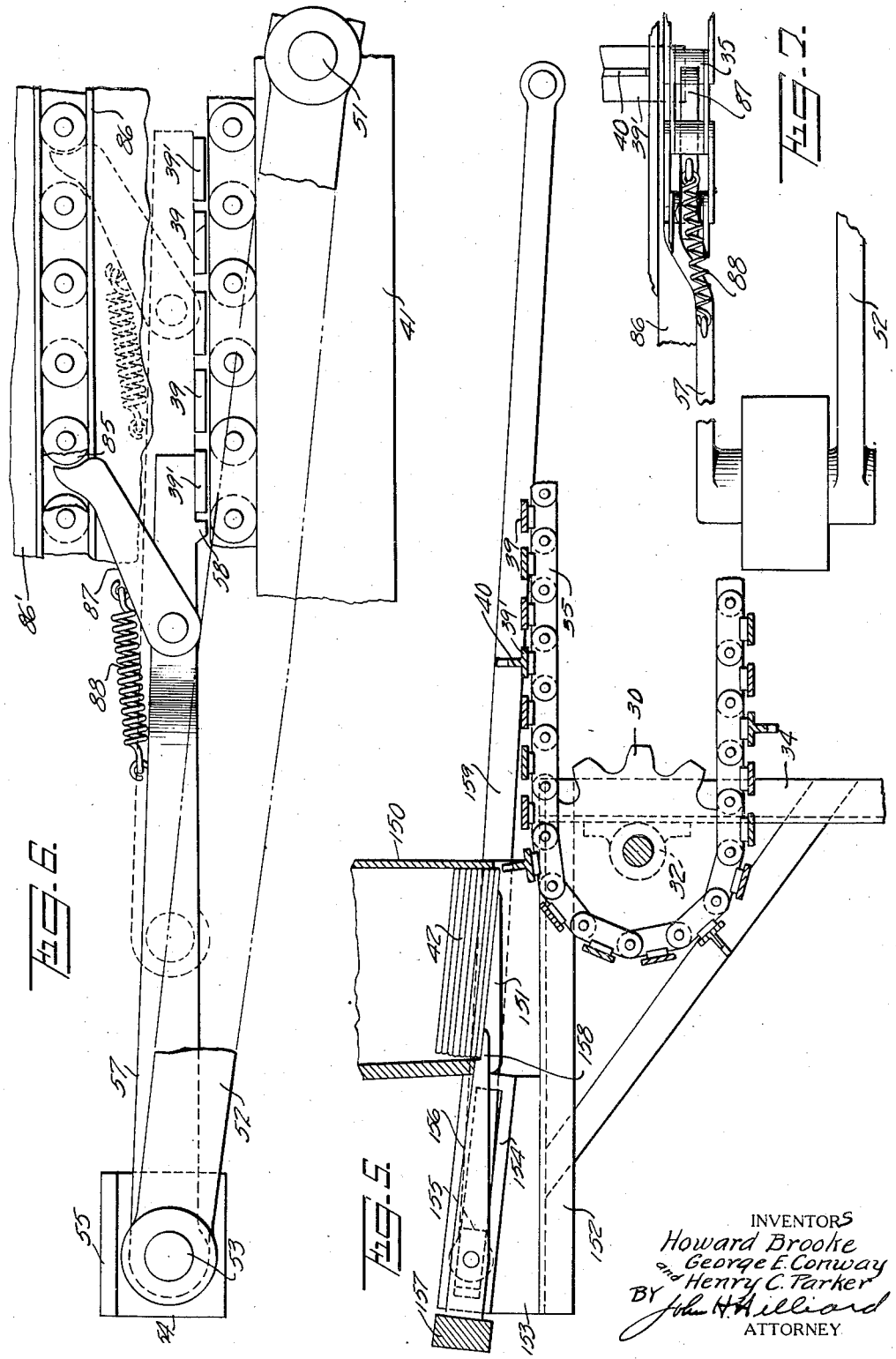

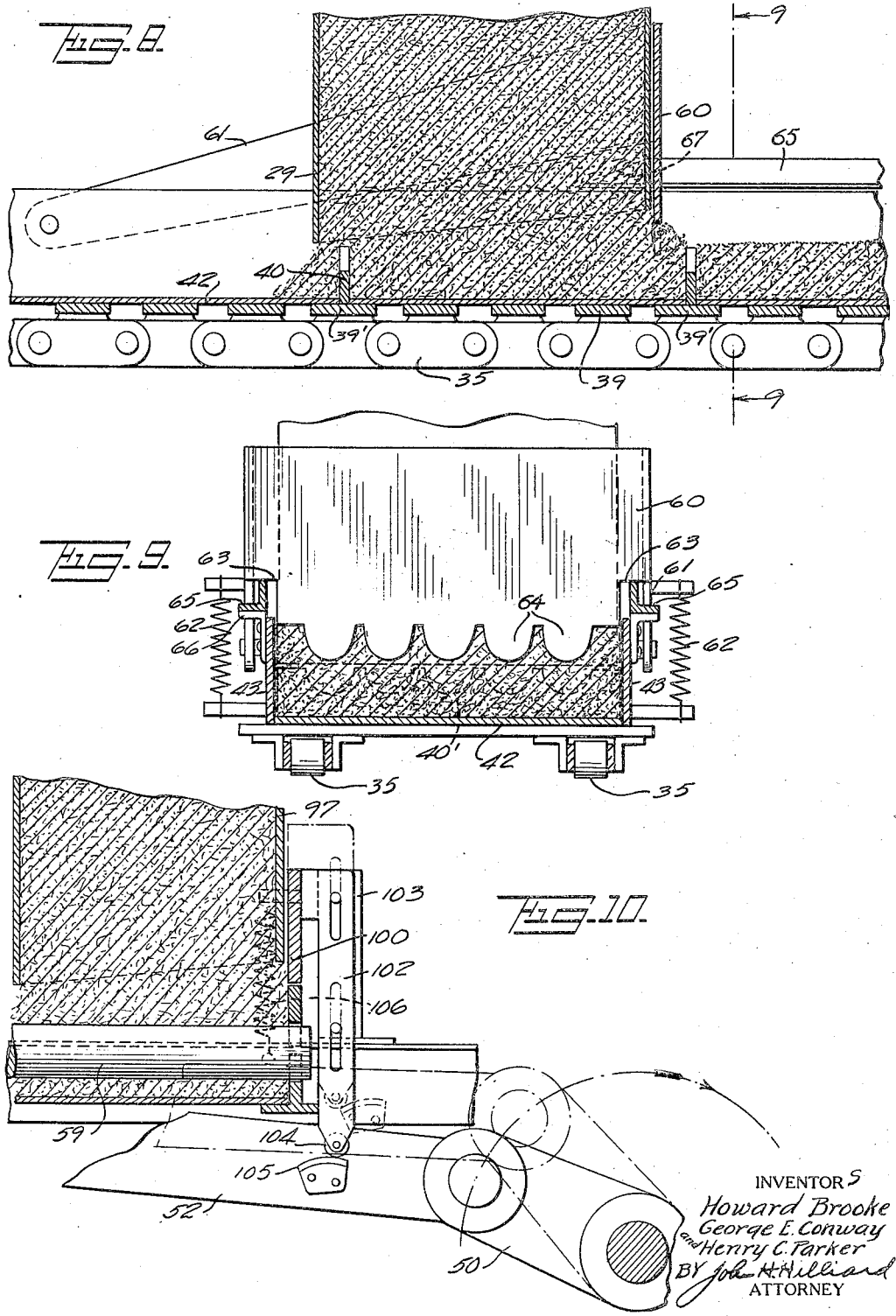

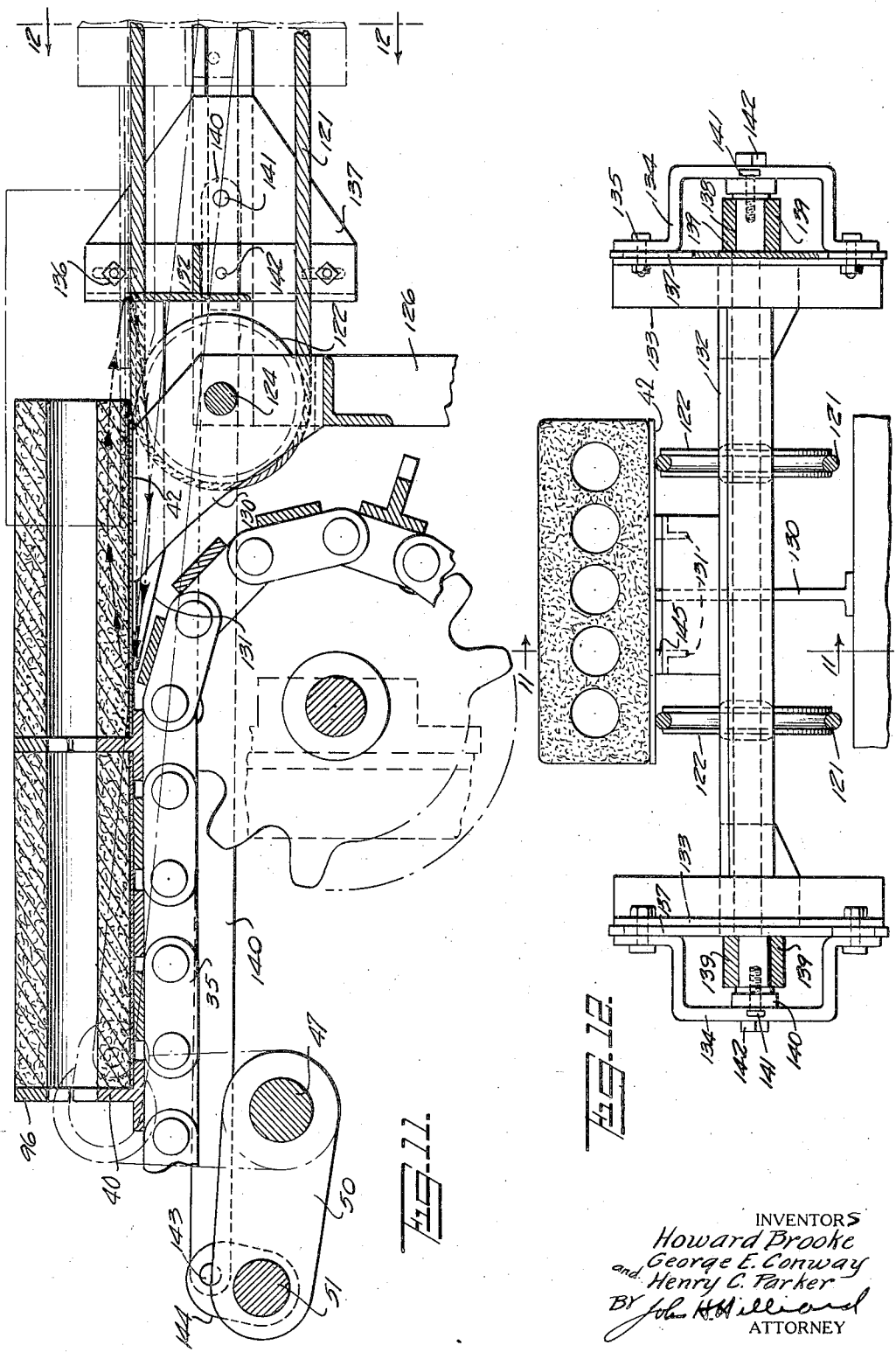

Oct. 16, 1934.   H. BROOKE ET AL   1,977,374
METHOD OF MAKING BLOCKS OF PLASTIC MATERIAL AND APPARATUS THEREFOR
Filed Aug. 6, 1927    9 Sheets-Sheet 8
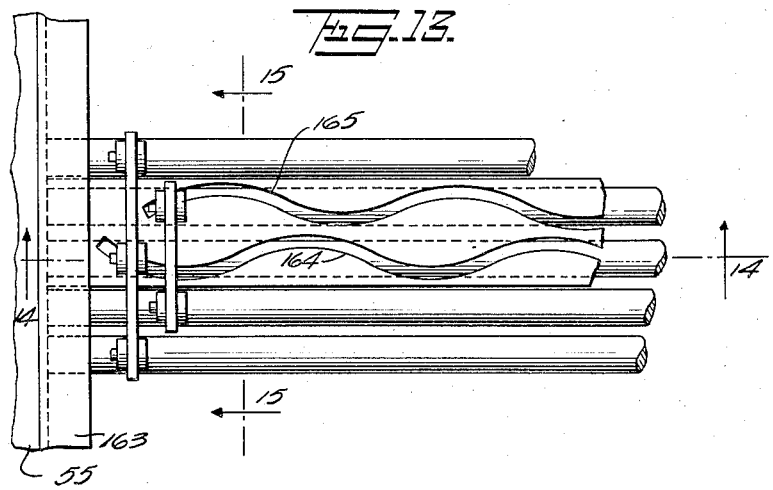
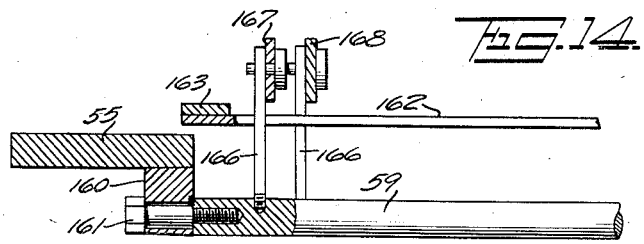
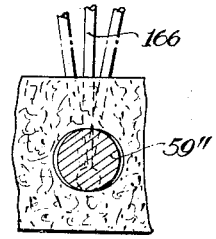
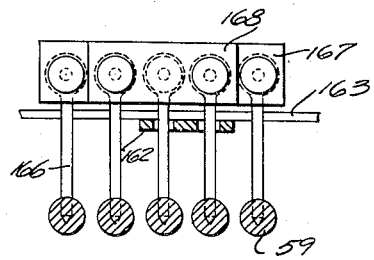
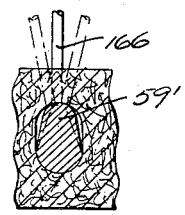
INVENTORS
Howard Brooke
George E. Conway
and Henry C. Parker
BY John H. Hilliard
ATTORNEY

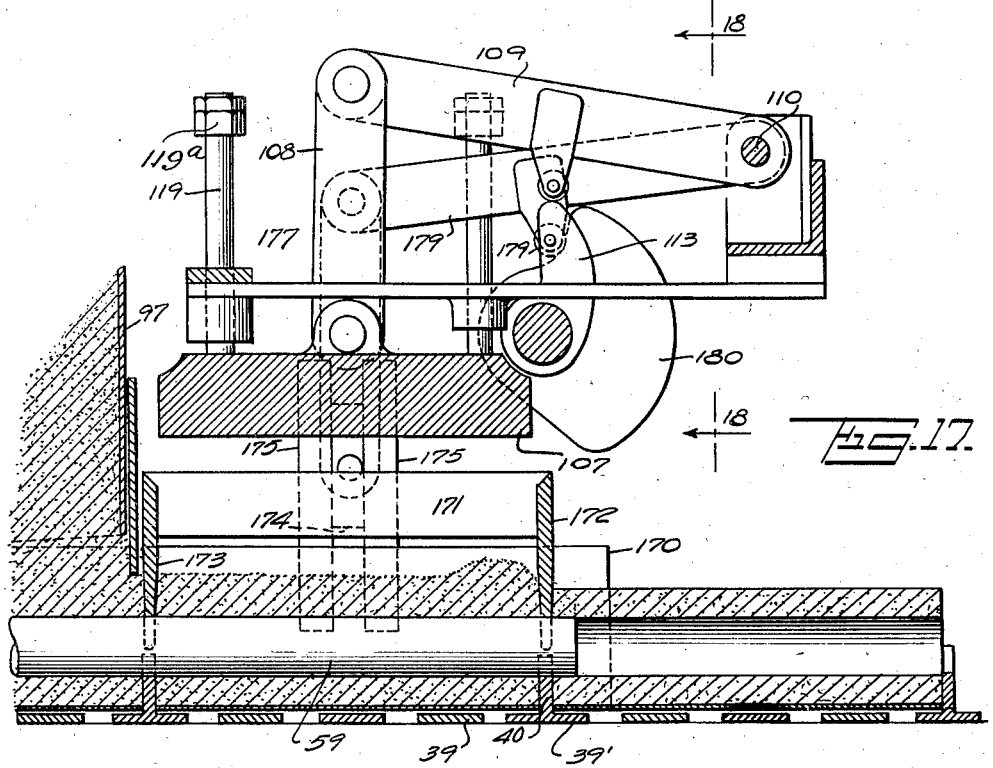
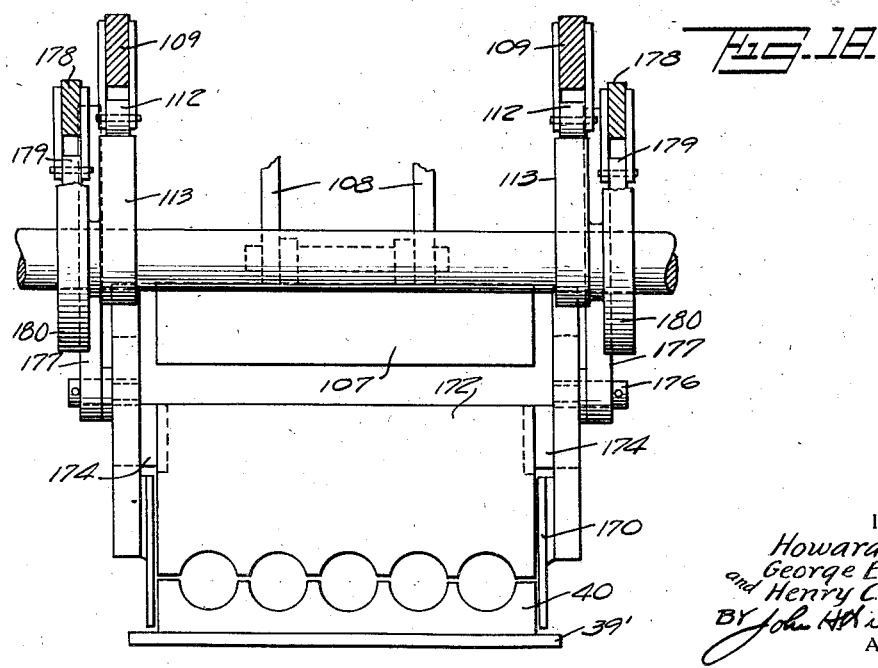

Patented Oct. 16, 1934

1,977,374

UNITED STATES PATENT OFFICE 1,977,374

METHOD OF MAKING BLOCKS OF PLASTIC MATERIAL AND APPARATUS THEREFOR

Howard Brooke, Englewood, George E. Conway, Cresskill, and Henry C. Parker, Hackensack, N. J., assignors to Bergen Building Block Company, a corporation of New Jersey Application August 6, 1927, Serial No. 211,060

28 Claims. (Cl. 25—100)

This invention relates to improvements in methods of making blocks of plastic material such as concrete and the like and to a machine on which the improved methods can be carried out. The invention relates particularly to the manufacture of hollow building blocks and articles of similar form but it is also adapted for the manufacture of solid blocks.

In the manufacture of hollow concrete blocks considerable difficulty is experienced in obtaining requisite homogeneity of material throughout the block particularly when certain aggregates are used. When the concrete consists of a mixture of sand and cement the mixture will flow comparatively freely and pressure on the surface of the mixture will be distributed fairly uniformly throughout the block, but when a cinder aggregate is used the jagged surfaces of the cinder interlock, obstructing the flow of the mixture, and pressure applied to the surface of the mixture will result in "arching", that is, the material at and adjacent to the point of application of pressure will be compacted, virtually forming an arch which prevents the pressure from penetrating to lower strata of the material.

It is customary in making hollow building blocks to cast the material in a mold provided with removable cores running lengthwise of the block. If the block is cast with the cores in horizontal position it is difficult and with some mixtures impossible to cause the mix to flow around and under the cores. For this reason it has been the practice to cast the blocks with the cores placed vertically so as to insure a uniform flow of material all around the cores. However, in order to provide the requisite strength it is necessary to compress the material in the mold, and when pressure is applied endwise of the block there is such a depth of material between the points at which pressure is applied that adequate compression is obtained only near the ends, while the intervening body is left weak and unduly porous.

Concrete building blocks made of cinder aggregate possess many advantages over blocks made of a mixture of sand and cement. They are much lighter and hence can be handled with less effort and at lower labor costs; they resist moisture; they provide better thermal insulation; they provide a better surface for holding plaster; they are more elastic and are of such composition that nails may be driven into them, the nails being held by the elasticity of the material. The principal drawback to the use of cinder blocks has been the difficulty of making them. It is therefore an object of the invention to provide an improved method by which blocks of cinder concrete may be manufactured economically with uniform distribution of material and uniform compression of material throughout the block.

Another object of the invention is to provide a machine which will automatically carry out the improved method of manufacture.

Another object of the invention is to provide a method of making concrete blocks in which compression of the material will be exerted in the direction of least thickness of the block, thereby overcoming the drawback of arching above referred to.

Another object of the invention is to provide a method of and machine for making blocks of plastic material in superposed layers and subjecting each layer to compression as soon as it has been deposited in the mold.

Another object of our invention is to provide a method of and means for first depositing a bottom layer, forming grooves in said layer, compacting the grooved surface of the layer so as to compress the material in the layer, placing cores in the grooves, and then applying an upper layer upon the bottom layer and compacting the material in the upper layer upon the bottom layer so that the two layers will be integrally joined and uniformly compressed about the cores.

Another object of the invention is to provide a method of and machine for carrying out the objects above stated and in which the lower layer will be advanced under a compressing roll but at a rate differing from that of the peripheral tread of the roll so as to produce slippage between the roll and the layer to prevent sticking of the material to the roll.

Another object of the invention is to provide means whereby the cores will be removed from the finished block while the block is under compression and whereby the block will be moved relatively to the compressing means just before the pressure is released so as to insure stripping of the block therefrom.

Another object of the invention is to provide a machine in which a series of molds are progressively formed, first to receive one layer of the block and then a second layer of the block, the molds traveling first under a hopper from which the mix for the lower layer is received and then under a second hopper from which the mix for the second layer is received.

Another object of the invention is to provide for depositing a greater depth of material from each hopper at the forward end of the mold to insure complete filling of the mold.

Another object of the invention is to provide means for transferring the blocks from the molds to a suitable conveyor.

With these and other objects in view which will appear hereinafter, we shall now describe a preferred embodiment of the invention and thereafter will define the novelty and scope of the invention in the appended claims.

In the accompanying drawings,

Fig. 1 is a plan view of an improved molding machine with certain parts removed and others broken away;

Fig. 2 is a side elevation of the same with certain parts broken away and removed at each end of the machine;

Fig. 3 is a fragmental side view, on an enlarged scale, of a portion of the machine largely broken away to illustrate certain details;

Fig. 4 is a view in transverse section taken on the line 4—4 of Fig. 2;

Fig. 6 is a detail view of mechanism for feeding the mold conveyors;

Fig. 7 is a fragmental plan view of the same;

Fig. 8 is a fragmental view in section taken on the line 8—8 of Fig. 1;

Fig. 9 is a view in cross-section taken on the line 9—9 of Fig. 8;

Fig. 10 is a detail view of mechanism for operating a strike-off or scraper plate near the forward end of the machine;

Fig. 11 is a fragmental view in longitudinal section of means for removing the finished blocks from the mold conveyors and transferring them to another conveyor;

Fig. 12 is a view in cross-section taken on the line 12—12 of Fig. 11;

Fig. 13 is a fragmental plan view of means for rocking the core bars used in the machine;

Fig. 14 is a view in longitudinal section taken on the line 14—14 of Fig. 13;

Fig. 15 is a view in cross section taken on the line 15—15 of Fig. 13;

Fig. 16 is a detail view in cross-section illustrating the operation of an alternative form of core bar;

Fig. 16a is a detail view in cross-section illustrating the operation of cylindrical cores mounted to rock eccentrically;

Fig. 17 is a detail view in longitudinal section of an alternative form of the machine, showing means for cutting off and compacting the blocks;

Fig. 18 is a view in cross-section taken on the line 18—18 of Fig. 17; and

Figs. 19, 20 and 21 are perspective views showing respectively some different forms of blocks which can be made on the machine.

Figure 5:
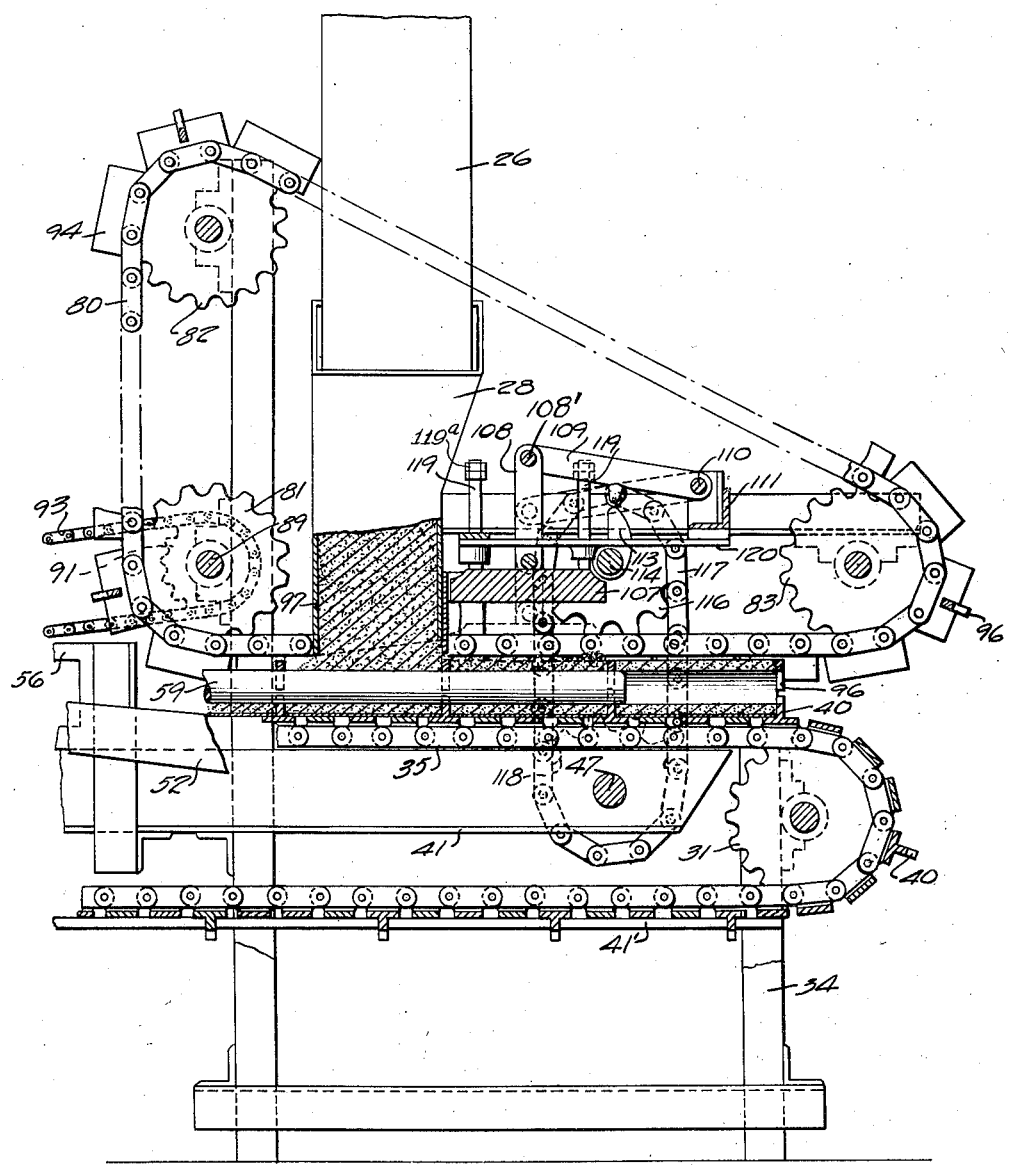
Fig. 5 is a view in section of a detail of the machine, the section being taken on the line 5—5 of Fig. 1.

In general the machine includes a pair of endless mold conveyors which progress intermittently lengthwise of the machine by steps each equal to the length of a mold. One of the conveyors extends practically the full length of the machine and in the molds carried and formed thereby the bottoms layers of the block are cast. The other mold conveyor is confined to the forward part of the machine and the molds carried thereby are brought into superposed registry with the molds of the first conveyor. The upper molds consist merely of side and end walls and when superposed on the lower molds provide virtually a vertical extension of the latter in which the top layer of the block is cast. The hollows in the blocks are formed by core bars which are mounted to reciprocate horizontally between the upper and lower molds, moving forward with the conveyors and returning while the conveyors are at rest. At the forward end of the machine the mold conveyors separate and the blocks are transferred to a delivery platform or to another conveyor which carries them to a suitable point of delivery.

Preferably the mixture of cement and cinders from which the blocks are to be formed is fed into the machine from an overhead platform or an upper floor of the building, although obviously the invention is not confined to this specific arrangement. As shown in Fig. 2, we provide two chutes 25 and 26 through which the mixture is lead into hoppers 27 and 28 respectively. The hopper 27 feeds the mixture into that portion of the machine in which the lower section of the block is to be made, while the hopper 28 supplies the mixture for forming the upper section of the block. The hopper 27 bears a depending rectangular spout 29 with a mouth or opening at the bottom which is of a width and length approximately equal to the width and length of the block to be made.

Passing under the hopper 27 is the lower mold conveyor which is supported on sprocket wheels 30 and 31 located respectively near opposite ends of the machine. The sprocket wheels are supported in suitable journals 32 and 33 respectively, carried by the main frame 34 of the machine. The conveyor is made up of a pair of endless chains 35 which are mounted in parallel relation and suitably spaced apart. Each chain consists of pairs of parallel side links 36 (see also Fig. 4) connected to and providing bearings for rollers 37. The links 36 are formed with lateral flanges 38 to which are secured transverse plates 39 connecting the two chains. At intervals of, say, every fourth link there is a transverse plate 39' which projects at each end beyond the plates 39. The plates 39' are T-shaped in cross section being provided with a centrally disposed outwardly projecting longitudinal flange 40. For convenience of reference the plates 39' and particularly the flanges 40 will be termed "lower division plates", because the flanges 40 serve to define the ends of the lower portion of the blocks to be formed. The outer edge of each flange 40, that is, the upper edge as it travels along the upper reach of the conveyor, is formed with recesses 40' which are of a shape to clear certain core members, as will be explained presently. The upper reach of each chain 25 is supported on a pair of guide rails 41 which provide tracks for the rollers 37 to roll upon, thereby preventing the conveyor from sagging. The lower reach of each chain engages a track 41' which also serves to prevent sagging. The guide rails 41 and 41' are secured to the main frame of the machine. Pallets 42 are supported on the transverse plates 39 between the lower division plates. Thus the pallets 42 and the division plates provide the bottom and ends respectively of the lower molds while the sides of the mold are formed by a pair of stationary plates 43 secured to the frame of the machine.

The transverse plates 39 and 39' extend under the lower edge of the side plates 43, as best shown in Fig. 4.

To propel the conveyor intermittently, the following mechanism is employed: In the base of the machine near one end, is located a motor 44 which drives a pinion 45 meshing with the gear 46. A reducing gear 45' such as a worm and worm-wheel is preferably interposed between the motor 44 and the pinion 45, and a flexible coupling 44' may be interposed between the motor and the reducing gear. The gear 46 is secured to a shaft 47 journalled in hangers 48 depending from longitudinal members 49 of the main frame of the machine. The shaft 47 projects at each end from the hanger 48 and is provided at each end with a crank arm 50 secured thereto.

A crank pin 51 is fixed to each crank, and pivotally mounted on each crank pin is a connecting rod 52 which at its opposite end is freely mounted upon a stud 53 carried by a crosshead block 54. The blocks 54 are connected by a transverse plate 55 (Figs. 1 and 6) constituting a crosshead which extends transversely across the machine just above the lower conveyor. The blocks 54 slide in ways formed in a pair of guide plates 56 at each side of the machine and thrust plates 56′ overlap the outer ends of the blocks to prevent end play of the crosshead. The studs 53 project inwardly from the blocks 54 and provide pivots respectively for a pair of arms 57. The latter extend forwardly and are inwardly offset so as to project into the path of the transverse plates 39′. Each arm has a tooth at its forward end, as indicated at 58 in Fig. 6, to engage a projecting end of a plate 39′. It will be evident that as the shaft 47 is rotated the crosshead 52 will be reciprocated and the arms 57 will move back and forth between the positions shown respectively in full and dotted lines in Fig. 6. As the arms 57 move forward they cause the chains 45 to advance. The parts are so proportioned that at each forward stroke of the crosshead the chains will be advanced through a space equal to the length of one mold. Pivoted on the side plates 43 are dogs 58′ (Fig. 2) which engage the projecting ends of plates 39′ and prevent retrograde motion of the chains. On the return stroke of the crosshead, the teeth 58 will ratchet over and engage the next plate 39′. By this mechanism a fresh mold is brought into registry with the spout 29 at each rotation of the shaft 47.

As shown in Fig. 8 the mouth of the spout 29 is inclined, the forward or righthand side being slightly higher than the rear or left hand side as viewed in the drawings. A strike-off device is provided adjacent the forward face of the spout 29 and consists of a plate 60 secured to or formed integrally with a pair of arms 61 which are hinged to the side plates 43 near the left hand end of the machine. Springs 62 are secured under tension to the arm 61 and plates 43 and serve to urge the plate 60 downward to the position shown in dotted lines in Fig. 8. In this position the shoulders 63 on the plate 60 rest upon the upper edges of the side plates 43. The lower edge of the plate 60, as shown in Fig. 9, is formed with projections or teeth 64 roughly conforming to the recesses 40′. When the plate 60 is in normal or depressed position the teeth 64 will project, with a certain predetermined amount of clearance, into the recesses 40′ as the lower division plates are drawn by. The concrete mixture feeds out of the spout 29 into the molds as they pass under the spout and the plate 60 serves to scrape off the surplus material, leaving just enough material in the mold to form the lower portion of the block.

We have found by experience that, owing to its extreme sluggishness, the mixture is apt to be dragged away from the division plate at the forward end of the mold so that the mold is not completely filled at this end. In other words because of interlocking of the jagged aggregates, the material will not be sharply sheared off by the plate 60. This difficulty we have overcome by raising the plate 60 to form a hump or an increased depth of the mixture at the forward end of the mold, which hump is later flattened out to fill the mold completely. To raise the plate 60 we provide a pair of bars 65 which extend rearwardly from the crosshead 55 and slide on brackets 66 secured to the side plates 43. At their rear ends these bars are tapered, forming cam surfaces 67 which are adapted to engage the shoulders 63 and raise the plate 60 as the crosshead 55 approaches the limit of its rearward stroke. Now when the crosshead moves forward, drawing a mold out from under the spout 29, the plate 60 will at first be held up by the bars 65 and then as the shoulders 63 encounter the cam surfaces 67 the plate 60, under the combined action of gravity and the springs 62, will be lowered to its normal depressed position. Thus a greater depth of material will be deposited in the form of a hump at the forward end of the mold, while in the rest of the mold the material will be scraped off to a level slightly higher than the upper edge of the division plates. The surface of the material including the hump will have grooves scraped therein by the teeth 64.

Journalled in bearings 69 secured to the main frame of the machine immediately in advance of the hopper 27, is a transverse shaft 70 to which is secured a roll 71. This roll, as shown in Fig. 1, is provided with a corrugated face, the corrugations being alined with the recesses 40′ in the lower division plates and hence also with the grooves scraped in the surface of the material in the mold. This roll is adapted to compact the material in the mold, compressing it to a uniform depth and forming the grooves in the surface of the material to receive a set of core bars 59 secured to the crosshead 55. The roll 71 is driven intermittently in step with the mold by means which will be described hereinafter, and it revolves in the same direction as the direction of travel of the mold, but with a slightly higher peripheral speed so as to prevent sticking of the material to the roll. The higher speed of the tread of the roll tends also to crowd the material forward, insuring the complete filling of the mold at the forward end thereof.

In the forward part of the machine is an upper mold conveyor consisting of a parallel pair of endless chains 80 which are more widely spaced than the chains 35 of the lower conveyor. The chains 80 pass about pairs of sprocket wheels 81, 82 and 83 suitably journalled in the main frame of the machine, and are formed of side links 84 and connecting rollers 85. Members 86 secured to the frame of the machine provide tracks for the rollers 85 to roll upon. Referring to Fig. 6, it will be observed that each arm 57 carries a pawl 87 which is normally drawn upward by a tension spring 88. The free end of each pawl is of such shape as to engage a roller 85 of the upper chain. It will be understood that the tracks 86 are partly cut away to clear the pawls 87. Thus as the pusher arms 57 are moved back and forth they will, on their forward stroke, carry the upper conveyor forward simultaneously with and to the same extent as the lower conveyor is being fed forward, while on the return movement of the pusher arms the pawls 87 will ratchet past the rollers and take up a position at the end of the rearward stroke similar to that shown by full lines in Fig. 6. By this means we insure perfect alinement of the two mold conveyors and an equal advance of the upper and lower chains at each rotation of the shaft 47. Overhead rails 86′ serve to take the upward thrust of the rollers 85 due to the action of the pawls 87.

The roll 71 is driven through suitable connections by the upper mold conveyor. The sprocket 81 is secured to a shaft 89 journalled in bearings 90 carried by the main frame. Fixed on the shaft 89 is a sprocket wheel 91. The shaft 70 also carries a sprocket wheel 92 secured thereon and a chain 93 connects the sprocket wheels 91 and 92. Thus, as the conveyors are propelled intermittently by the pusher arms 57, the roll 71 will also receive an intermittent rotary motion in step with the advance of the mold conveyors. However, and for the purposes above stated, the diameter of the roll 71 is such that its peripheral speed will be slightly higher than the speed of the mold conveyors.

Each mold of the lower conveyor, after passing under the roll 71, comes to rest, and the crosshead on its return reciprocation draws the core bars 59 into the grooves formed by the roll 71 in the material in the mold. On the next advance of the crosshead the core bars and mold move together under the upper mold conveyor.

The upper mold conveyor carries side plates 94 which are attached to spacer blocks 95 secured to the inner links 84 of the conveyor chains 80. The plates 94 are adapted to move in vertical alinement with the fixed side plates 43, as shown in Fig. 4. And certain of the side plates 94 carry transverse plates 96 which we will term the "upper division plates." These plates are so spaced as to come into vertical alinement with the lower division plates 40. The upper division plates are also provided with recesses 96' which mate with the recesses 40' to form openings through which the core bars 59 are adapted to pass. Thus the side plates 94 and division plates 96 form molds for the upper portion of the block. These molds require no bottom plate as the previously formed portion of the block serves as the bottom of the upper mold. In other words the upper section of the block is cast directly upon the pre-formed lower section.

The forward hopper 28 is provided with a spout 97 which is of rectangular form and projects between the side plates 94. The core bars 59 are of sufficient length to extend slightly beyond the spout 97 when the crosshead is in retracted position. As the molds pass intermittently under the spout 97 they are filled with the concrete mixture which is scraped off by a strike-off plate 100 mounted adjacent the forward face of the spout 97. For the same reason as described above in connection with the deposit of material in the lower molds, it is desirable to provide a hump of material at the forward edge of each upper mold. This is effected by lifting the plate 100 slightly just as the forward edge of the mold proceeds out from under the spout 94 and then permitting the plate 100 to drop and scrape off the rest of the surface of the material in the mold to a lower level. The mechanism by which the plate is raised and lowered is best shown in Figs. 1 and 10. Projecting laterally from each side of plate 100 are arms 101 which are connected at their outer ends respectively to depending plates 102. The latter have pin and slot connection with vertical supports 103 secured to the main frame of the machine. Each depending plate 102 carries at its lower end a roller 104 in such position as to engage a cam 105 secured to the connecting rod 52 as the rod is oscillated by its engagement with the crank 50. The position of the roller 104 and cam member 105 is such that at the moment when the mold starts forward the roller will be lifted, raising the plate 100 and permitting a greater depth of material to be drawn out at the forward edge of the mold. In Fig. 10 the normal position of the parts at the moment of engagement of the roller 104 with the cam member 105 is shown in full lines, while in broken lines is shown the position of the parts just as the roller is about to drop off the cam piece 105. As soon as the cam clears the roller the scraper plate 100 drops by gravity aided by springs 106.

Immediately forward of the hopper 28 we provide means for compacting the material in the mold. As shown in Figs. 3 and 4 the compacting device consists of a heavy block of metal 107 which is suspended by links 108 from a cross bar 108' carried by the free ends of a pair of arms 109. These arms are pivoted on a rod 110 carried by a transverse member 111 of the frame of the machine. Each arm 109 carries a roller 112 which is adapted to be engaged by a cam 113. The cams 113 are fixed to a shaft 114 which is journalled in bearings 115 carried by the hangers 48. Secured on one end of the shaft 114 is a sprocket wheel 116, and a chain belt 117 runs from the sprocket 116 to a sprocket 118 secured to the shaft 47. Thus the cams 113 are rotated in timed relation to the operation of the conveyors, the timing of the cams 113 being such that as each mold passes out from under the hopper 28 the compacting head 107 is permitted to drop on the material in the mold directly thereunder and compress the concrete deposited from the spout 97 upon the preformed lower portion of the block contained in the mold.

In order to insure proper alinement of the compacting head 107 with the mold the former is provided with vertical guide rods 119 which pass through bearings in plates 120. The latter are fixed at one end to the frame member 111 and at the opposite end to a transverse member 120' secured to the frame of the machine. Adjustable on the guide rods 119 at their upper ends are nuts 119a which co-act with the plates 120 to limit the drop of the compacting head 107. The design of the cam 113 is such as to permit the head 107 to lie in contact with the concrete in the mold while the core members 93 are being withdrawn from the block. After the cores 93 are withdrawn the head 107 settles until the stops 119a engage the plates 120. In so doing the concrete is further compressed and the core openings are somewhat distorted but blocks of uniform depth are obtained despite slight variations in quantity or consistency of the material of which the blocks are composed. In order to provide against sticking of the concrete to the head 107, the raising of the head is delayed until after the mold has started forward on its next step.

As the mold proceeds forward from the head, the block is completed and the next step is to transfer the block to a conveyor which will carry it to a convenient point away from the machine, where it may be lifted off and stored in a suitable location to permit the concrete to set. To carry off the blocks from the machine we provide a conveyor consisting of a parallel pair of endless rope belts 121 supported on pulleys 122 and 123. The pulleys 122 at the rear or left hand end of the conveyor run freely on a shaft 124 (see Fig. 11) while the pulleys 123 at the opposite end of the conveyor are fixed to a shaft 125. The shafts 124 and 125 are mounted in a suitable frame 126. A motor 127 is connected by means of a belt 128 and pulleys to the shaft 125 and serves to drive the shaft at such speed that the rope conveyor will travel slightly faster than the conveyors in which the molds are formed.

We have found by experience that it is not desirable to let the blocks and the pallets on which they are supported drop off the mold conveyors upon the rope conveyor. There is a tendency for the pallet to be twisted in this operation and also there is the danger that the division plates of the molds, as they are carried around the sprocket wheels of the upper and lower conveyors, will injure the soft, freshly-formed blocks; and for this reason a special mechanism has been provided for transferring the block from the mold conveyors to the rope conveyor.

Extending rearward from the frame 126 is a plate 130, centrally disposed with respect to the mold conveyors and adapted to support the forward end of the pallet 42 as it is projected forward by the mold conveyors. A pair of rearwardly projecting arms 131, one at each side of the plate 130, are adapted to lift the pallet off the plate 130 and deposit it upon the rope conveyor. The arms are secured to a crosshead 132 which at each end is provided with vertical members 133. To each of the vertical members 133 is attached a strap member 134 by means of bolts 135. The bolts pass through slots 136 in triangular shaped plates 137, one at each side of the conveyor and each of these triangular plates carries a slide block 138 which is adapted to slide between horizontal parallel rails 139 forming part of the conveyor frame 126. A connecting rod 140 at each side of the machine is pivoted at its forward end to the block 138 by means of a pivot pin 141; while a second pivot pin 142 connects the rod 140 to the strap 134. The rear end of each connecting rod 140 is connected by a pivot pin 143 to a short crank arm 144 fixed to the crank pin 51. Thus as the shaft 47 is rotated the connecting rods 140 will reciprocate the plates 137 along the rails 139. Owing to the bolt and slot connection between the plates 133 of the crosshead and the plates 137, the arms 131 will also be reciprocated, and at the same time owing to the pivotal connection of the straps 134 with the rods 140 the arms 131 will be moved up and down so that the extreme rear end of the arms will describe an eliptical orbit such as indicated by the arrows in Fig. 11.

Owing to the short crank arm 144 which is offset with respect to the crank arm 50 the movement of the arms 140 will be advanced with respect to the movement of the pusher bars 57 and hence before the mold conveyor starts to move forward the foremost finished block and its pallet will be lifted by the arms 131 off the plate 130 and carried forward clear of the division plates. It will be clear from Fig. 11 that the arms 131 rise above the upper edge of the supporting plate 130 on their forward movement and return below the level of said plate into position to engage the under side of the next succeeding pallet. Fig. 11 shows by full lines the position of the arms as they are about to lift the pallet and by dotted lines, the position of the block and the connecting rod 140 when the arms have proceeded a little more than half way on their forward stroke. The stroke of the arms 131 is equal to the stroke of the pusher bars 57, so that each forward block is lifted out of the way of the next succeeding block and deposited on the ropes 121 of the rope conveyor. In order to prevent damage to the blocks which are still very soft and fragile the arms 131 are provided with pads 145 of rubber or other resilient material which will take up any shock when the arms strike the under side of the pallets.

The pallets 42 may be placed on the lower conveyor by hand if desired, but we prefer to have them fed mechanically into the machine. At the rear end of the machine, that is the lefthand end as viewed in Figs. 1, 2, and 5, we provide a casing 150 in which are stacked a plurality of plates 42. The bottom of the casing is open but is provided with a pair of forwardly projecting arms 151 adapted to support the pile of pallets so that the only way in which the pallets can be removed from the bottom of the casing 150 is to slide them forward clear of the arms 151. Supported on an extension 152 of the main frame 34 of the machine are a pair of plates 153 which support ways 154 in which blocks 155 are adapted to slide. Pivoted on each block is a finger 156. The fingers are connected at the rear by a crosshead 157 which is of sufficient weight to hold the forward end of the fingers in raised position. The fingers are formed with shoulders 158 adapted to engage the lowermost pallet 42 in the casing 150. Connecting rods 159 are pivoted at one end to the pins 53 and at the other to the slide blocks 155. Thus with each forward movement of the connecting rods 52 the blocks 155 are also moved forward and the fingers 156 push out the lowermost pallet 42 from the casing 150 permitting it to drop into place between the lower division plates 40 upon the lower conveyor.

In order to prevent the core bars from adhering to the mixture in the molds we prefer to rock the bars as they are reciprocated. The means for rocking the bars is shown in Figs. 13 to 15 inclusive. (It will be understood that the rocking mechanism has been omitted from Fig. 1 for purposes of clarity.) The core bars 59 are pivotally secured to a block 160 which is fastened to the under side of the crosshead plate 55, the pivotal connection consisting of screws 161 which have a bearing surface in the block 160 and are threaded into the ends of the core bars 59 respectively. Directly overlying the core bars 59 is a cam plate 162 secured to transverse members 163 supported on the guide plates 56. The plate 162 is formed with slots 164 and 165 which run lengthwise of the machine. As shown in Fig. 14 these slots are of sinusoidal form alternately approaching and diverging from each other. Projecting vertically from each core bar 59 is a pin 166, alternate pins being pivotally connected to a crosshead 167 and intermediate pins to a crosshead 168; so that by moving a crosshead endwise all the bars connected thereto will be rocked on their pivots 161. One of the pins 166 connected with the crosshead 167 passes through the cam slot 164 while one of the pins connected to the cross head 168 passes through the cam slot 165. Now it will be evident that as the crosshead 55 reciprocates carrying the core bars 59 with it, the cam surfaces of plate 162 will cause the bars to rock, with successive bars rocking in opposite directions. This rocking movement keeps the bars from adhering to the material in the molds and prevents the material from being dragged rearward as the bars are withdrawn from the mold.

The bars 59 may be of cylindrical form to produce blocks with cylindrical hollows such as shown in Fig. 19. However, if desired, the blocks could be formed with cored openings of oval or oblong form, as shown in Fig. 20. In this case the core bars would have an egg-shaped cross-section such as shown at 59' in Fig. 16 with a larger diameter at the bottom than at the top. The bars would then be pivoted to rock on the axis of the larger diameter which would result in swinging the upper part of each block back and forth as it was rocked by engagement with a cam slot. The advantage of this arrangement is that rocking of the bars will tend to feed the sluggishly flowing material between the bars and to compress the material at each side of the core opening, and by having successive bars rock in opposite directions, the material will be compressed laterally between alternate pairs of bars. A similar effect may be obtained by using cylindrical cores 59'' as shown in Fig. 16a, said cores being mounted to rock eccentrically.

The operation of our machine is as follows: A suitable mixture of concrete is fed through the chutes 25 and 26 into the hoppers 27 and 28. At the rear end of the machine the mixture in the hopper 27 passes through the spout 29 into the mold formed in the lower conveyor. The parts are so arranged that the lower conveyor comes to rest under the spout 29 with the division plates 40 alined respectively with the front and rear walls of the spout 29. Between each pair of division plates there is a pallet 42 which has previously been deposited on the conveyor either by hand or by the pallet feeding mechanism described above. Thus a mold is formed on the lower conveyor for the lower portion of the block, the sides of the mold being formed by the fixed side plates 43. The crosshead 55 is then drawn forward and the pusher bars 57 engage the projecting ends of the plates 39' pushing the lower conveyor forward through a distance equal to the length of one of the molds. As the mold starts out from under the spout 29 the strike-off plate 60 is held in raised position by the arms 65, but as the latter are drawn away by the crosshead, the plate 60 is drawn downward by the springs 62, scraping off the material in the mold to a lower level. Thus a greater depth of material is deposited at the forward end of the mold. The scraper 60 also scrapes grooves in the surface of the material in the mold which are presently to be formed into half round recesses to receive the core bars. As the mold moves forward it encounters a roll 71 with a corrugated periphery which compresses the material and rolls smooth grooves in the surface thereof. The roll 71 has a peripheral speed which is slightly greater than the speed of the mold to prevent sticking to the material and to crowd the material into the forward end of the mold. The lower mold conveyor proceeds with a step by step movement and at each step draws a mold full of concrete out from under the spout 29. After passing the roll 71 the mold with its compacted contents passes under the crosshead 55 and the grooves formed in the surface of the material in the mold come into registry with the core bars 93. These core bars it will be recalled, are supported at their rear ends only while their forward ends sag to a certain extent and exert a certain amount of pressure upon the material in the molds. The core bars move forward with the molds and return while the molds are held stationary, and during both forward and rearward movement the bars are rocked by engagement with the cam plate 162.

Simultaneously with the operation of the lower conveyor belt the upper conveyor belt is moved forward with an intermittent motion by the pawls 87. The side plates 94 are brought into alinement with the fixed side plates 42 and the upper division plates 96 close over the core bars and come into alinement with the lower division plates 40. Thus the upper conveyor forms molds which register with the molds formed in the lower conveyor and as the combined molds formed by the two conveyors pass under the spout 97 of the hopper 28, they are filled with concrete mixture which is struck off to the proper depth by means of the scraper plate 100. The scraper plate 100 is lifted for a moment just as the mold passes out from under the spout 97 by engagement of the rollers 104 with the cam members 105 carried by the connecting rods 52. As the conveyors now pass out from under the spout 97 the mold is brought to rest under the head 107. The latter then drops and compacts the material in the mold and remains in contact with the material while the crosshead 55 is moving rearward, drawing the core bars 89 clear of the finished block. This prevents the material from being dragged back by frictional engagement with the bars and the rocking motion of the bars also prevents sticking of the material thereto. When the cores are withdrawn the head 107 further compresses the block to a predetermined depth which is gaged by the adjustable nuts 119a. The head 107 also remains in contact with the block for a short interval during the next forward step of the mold so as to prevent sticking of the concrete to the head. As the finished block moves forward to the end of the upper and lower conveyors it is picked up by the arms 131 and deposited upon the rope conveyor which carries it to a convenient point of delivery.

In Figs. 17 and 18 we show an alternative construction in which the upper mold conveyor is dispensed with. The lower part of the block is formed in the manner described above and carried forward intermittently under the spout 97. In this case, however, fixed side plates 170 are used which take the place of the side plates 43 and are deep enough to retain the material deposited from the spout 97. The upper part of the block is then cast upon the lower part without division plates. As the mold conveyor comes to rest below the head 107 the upper portion of the block is cut off into proper lengths by means of a box frame 171 including forward and rear division plates 172 and 173 which register with the division plates 40 of the lower mold. The box frame 171 is formed with end blocks 174 at each end which slide between parallel bars 175 secured to the side plates 170. Pins 176 carried by the blocks 174 provide attachment for links 177 which are connected at their upper ends to arms 178 fulcrumed on the shaft 110. The arms 178 carry rollers 179 which are engaged by cams 180 fixed to the shaft 114. The form of the cams 172 is such as to hold the frame 163 in raised position until the conveyor belt has come to rest under the head 107. But just prior to the dropping of the head 107 the cam 180 permits the frame 171 to drop and cut off the upper portion of the block. Immediately thereafter the head 107 drops on the material within the frame and compacts it between the division walls 172 and 173 and the side plates 170. Before the head 107 rises the frame 171 is raised by the cam 180 to permit the block to proceed on its next forward step.

In Figs. 19, 20 and 21 we show three forms of block which can be made on the machine. The block shown in Fig. 19 is formed with round core holes while the core holes shown in Fig. 20 are elongated or oval in section. In Fig. 21 we show a furring block which is virtually a half block of the type shown in Fig. 19. The furring block may be made by simply cutting off the supply of concrete fed through the chute 26.

Obviously other forms of blocks could be produced on the machine by slightly varying the dimensions. Under certain conditions rocking of the core bars may be dispensed with. In fact, we have made very satisfactory blocks on our machine without rocking the core bars. By omitting the core bars and using a solid roll instead of a corrugated roll 71, solid blocks could be formed, the blocks being cast in successive layers to insure proper compacting of the material.

While we have described a preferred form of our invention and a modification thereof, we do not limit ourselves to the specific constructions described, but consider ourselves at liberty to make such alterations, modifications and variations in form and arrangement of parts as fall within the spirit and scope of the invention as defined in the following claims.

We claim:

1. In the method of forming concrete blocks the steps which consist in casting a layer of the block, forming a groove in the upper face of the layer, compressing said grooved face to compact the layer, placing a core in said groove, casting a second layer on said face and core, and compacting the second layer on the first layer.

2. In the method of forming concrete blocks the steps which consist in casting a layer of the block, compacting the layer and simultaneously forming a depression in the face thereof, inserting a core in the depression, casting a second layer on the first and on the core, and compacting said second layer on the first layer.

3. In the method of forming concrete blocks the steps which consist in casting a layer of the block, compacting said layer, placing a core on the upper face of said layer, superposing a second layer upon said face and core, compressing the second layer on the first, and withdrawing the core while said second layer is under compression.

4. In the method of forming concrete blocks the steps which consist in casting a layer of the block, rolling a groove in the surface of the layer, placing a core in the groove, casting a second layer on the core and on the first layer, compacting the second layer, and withdrawing the core.

5. In the method of forming concrete blocks the steps which consist in casting a layer of the block, forming a depression in the upper face of the layer, rolling said face to compact the layer, placing a core in the depression, casting a second layer of the block on the core and on the first layer, subjecting the block to pressure to compress the second layer, and withdrawing the core from the block while said block is under compression.

6. In the method of forming concrete blocks, the steps which consist in casting a layer of the block, compacting said layer, placing a core on said layer, casting a second layer on the first layer and on the core, compacting said second layer on the core and on the first layer, and eccentrically rotating the core to produce lateral compression of material on each side thereof.

7. In the method of forming concrete blocks, the steps which consist in casting material into a mold and providing a heap of said material at the forward end of the mold, and subjecting the material in the mold to pressure to compact the material and to completely fill the forward end of the mold.

8. In the method of forming concrete blocks the steps which consist in drawing a mold under a chute to scrape off a deposit of material therefrom, providing a heap of said material at the forward end of the mold, and rolling the material toward the forward end of the mold to compact the material and completely fill the forward end of the mold.

9. In the method of forming concrete blocks the steps which consist in drawing a mold under a chute to receive a deposit of material therefrom, scraping off surplus material from the mold but leaving a heap of said material at the forward end thereof, passing the mold under a roll to compress the material, and positively driving the roll with a peripheral speed higher than the speed of the mold to force the heap of material into the forward end of the mold and effect cleavage between the material and the roll.

10. A machine for making concrete blocks comprising in combination, a mold, means for depositing a layer of cement mixture in the mold, means for forming a groove in the upper face of the layer, means for compressing said grooved face to compact the layer, a core, means for inserting the core in said groove, means for depositing a second layer of material on the core and on the first layer, and means for compressing the second layer on the first layer.

11. A machine for making concrete blocks and comprising in combination, a mold, means for depositing a layer of cement mixture in the mold, means for compacting said layer, a core, means for placing said core on said layer, means for depositing a second layer of cement mixture on the core and the first layer, means for compacting the second layer on the core and on the first layer, and means for rocking the core.

12. A machine for making concrete blocks and comprising in combination, a mold, means for depositing a layer of cement mixture in the mold, means for compacting said layer, a core, means for placing said core on said layer means for depositing a second layer of cement mixture on the core and the first layer, means for compacting the second layer on the core and on the first layer, and means for moving the core to effect compression of material on each side thereof.

13. A machine for making concrete blocks and comprising in combination, a mold, means for depositing a layer of cement mixture in the mold, means for compacting said layer, a core, means for placing said core on said layer, means for depositing a second layer of cement mixture on the core and the first layer, means for compacting the second layer on the core and on the first layer, and means for rocking the core eccentrically to effect lateral compression of material on each side thereof.

14. In a machine for making concrete blocks, a mold, a chute, adapted to deposit material in the mold, a scraper, means for moving the mold relatively to the chute and the scraper, and means for raising and lowering the scraper, the latter means being timed with respect to movement of the mold to form a heap of the material at the forward end of the mold.

15. In a machine for making concrete blocks, a mold, a chute for depositing material into the mold, a scraper for scraping off surplus material from the mold, the scraper being formed with teeth for scraping grooves in the surface of the material in the mold, a roll formed with corrugations alined with said grooves and adapted to engage and compress the material in the mold, means for intermittently moving the mold relative to the scraper and the roll, means for positively driving the roll with a peripheral speed higher than the speed of the mold, and means operating in timed relation to the movement of the mold for raising the scraper during initial movement of the mold thereunder to provide a greater depth of material at the forward end of the mold.

16. In a machine for making concrete blocks, a conveyor, molds carried thereby, a chute adapted to deposit material in the molds successively, a scraper for scraping off surplus material from each mold, a roll mounted to turn on a relatively fixed axis and adapted to compress the material in each mold, means for moving the conveyor intermittently to carry the molds under the chute and the scraper and the roll, and means for intermittently driving the roll in step with the conveyor but at a peripheral speed higher than the speed of the mold.

17. In a machine for making concrete blocks, a pair of endless conveyors mounted in superposed relation and cooperating to form a mold therebetween, a core bar reciprocable lengthwise of the conveyors and projecting endwise into the mold, and means for advancing the conveyors at each forward stroke of the core bar.

18. In a machine for making concrete blocks, a pair of endless conveyors mounted in superposed relation and cooperating to form a mold therebetween, a core bar reciprocable lengthwise of the conveyors and projecting endwise into the mold, means for advancing the conveyors at each forward stroke of the core bar, and means for rocking the core bar during reciprocation thereof.

19. In a machine for making concrete blocks, a pair of superposed conveyors cooperating to form a mold, a reciprocable member, a plurality of core bars carried thereby between the conveyors and projecting into the mold, and means for rocking alternate core bars oppositely during reciprocation thereof, each core bar having certain opposed surface portions lying at respectively different radial distances from the axis about which the bar is rocked.

20. In a machine for making concrete blocks, a pair of superposed conveyors cooperating to form a mold, a reciprocable member, a plurality of core bars eccentrically journalled in said reciprocable member, the core bars extending between the conveyors into the mold, and means for rocking alternate core bars oppositely during reciprocation thereof.

21. In a machine for making concrete blocks, a pair of superposed conveyors cooperating to form a mold, a reciprocable member, a plurality of horizontal core bars carried by said member between the conveyors and projecting into the mold, the bars being of substantially ovate cross-section with a larger diameter at the bottom and being journalled in said member to rock on the center of the larger diameter, and means for rocking alternate core bars oppositely during reciprocation of the bars.

22. In a machine for forming concrete blocks, a pair of superposed conveyors, mold parts carried by each conveyor, said mold parts cooperating to form molds during a portion of the travel of the conveyors, a reciprocable member, core bars carried thereby and extending between the conveyors into the molds, and means carried by the reciprocable member for simultaneously advancing both conveyors with the core bars on the forward stroke of said member but permitting the conveyors to stand still while the core bars are moved rearward on the return stroke of said member.

23. In a machine for forming concrete blocks, a plurality of vertically separable molds, a pair of superposed conveyors, one of said conveyors carrying the upper portions of the molds and the other the lower portions of the molds, a reciprocable member adapted to impart intermittent forward movement to the conveyors, core bars rotatably secured at one end to said member, said molds being formed with end openings through which the core bars project, and cam means coacting with the core bars to impart rotary motion to the bars during reciprocation thereof.

24. In a machine for making concrete blocks, an endless chain conveyor, a plurality of molds carried thereby, a second endless chain conveyor superposed over a portion of the first named conveyor, side plates carried by the second conveyor in alinement with the sides of the molds, transverse division plates carried by the second conveyor in alinement with the ends of the molds, the side plates and division plates providing vertical extensions of the molds, means for casting a layer of concrete mixture in the molds successively, means for successively compacting the material in the molds, means for casting a layer of concrete mixture in the molds after they have been vertically extended, and means for compressing the upper layer upon the lower layer.

25. The method of making concrete blocks in a mold having a core, which includes the steps of casting concrete in the mold, applying pressure to compact the concrete, completely withdrawing the core from the mold while the pressure is applied, thereafter moving the mold with respect to the pressure means to prevent adherence of the concrete to said means, and subsequently stripping the mold from the block.

26. The method of making concrete blocks, which comprises casting a layer of the block, compressing said layer, casting a second layer on the first, subjecting substantially the entire outer face of the second layer to simultaneous compression, and thereafter producing relative lateral movement between the compressing means and the block to prevent adherence of concrete to the compressing means.

27. The method of making concrete blocks, which comprises casting a layer of the block, compressing said layer, casting a second layer on the first, subjecting substantially the entire outer face of the second layer to simultaneous compression, thereafter moving the block during compression laterally with respect to the direction of compression, and stripping the mold from the block.

28. In a machine for making concrete blocks, the combination of a mold, means for depositing a layer of cement mixture in the mold, means for compacting said layer, means for depositing a second layer of cement mixture on the first layer, a compactor adapted to subject substantially the entire upper face of the second layer to compression, and means for moving the mold laterally while the concrete is under pressure to effect cleavage of the concrete with respect to the compactor.

HOWARD BROOKE.
GEORGE E. CONWAY.
HENRY C. PARKER.